United States Patent
Seul

(10) Patent No.: US 12,415,929 B2
(45) Date of Patent: Sep. 16, 2025

(54) FRP BOARD WITH REINFORCED NON-FLAMMABILITY

(71) Applicant: Jin Jung Seul, Bucheon-si (KR)

(72) Inventor: Jin Jung Seul, Bucheon-si (KR)

(73) Assignee: Seul Jin Jung, Bucheon-si (KR)

( * ) Notice: Subject to any disclaimer, the term of this patent is extended or adjusted under 35 U.S.C. 154(b) by 467 days.

(21) Appl. No.: 18/076,938

(22) Filed: Dec. 7, 2022

(65) Prior Publication Data

US 2023/0174798 A1 Jun. 8, 2023

(30) Foreign Application Priority Data

| Dec. 7, 2021 | (KR) | ......................... | 10-2021-0174194 |
| Dec. 7, 2021 | (KR) | ......................... | 10-2021-0174195 |
| Nov. 15, 2022 | (KR) | ......................... | 10-2022-0152276 |
| Nov. 15, 2022 | (KR) | ......................... | 10-2022-0152277 |

(51) Int. Cl.
  *C09D 5/18* (2006.01)
  *C08J 5/04* (2006.01)
  (Continued)

(52) U.S. Cl.
  CPC ................ *C09D 5/18* (2013.01); *C08J 5/043* (2013.01); *C08J 7/05* (2020.01); *C08K 3/32* (2013.01);
  (Continued)

(58) Field of Classification Search
  CPC .......... C09D 5/18; C09D 4/00; C09D 167/08; C09D 183/04; C09D 185/02; C08G 77/04; C08K 3/32; C08K 5/5333; C08K 2003/322; C08K 5/34922; C08K 5/5357; C08J 5/043; C08J 7/05; C08J 7/042; C08J 2483/04; C08L 83/04; C08L 33/04
  See application file for complete search history.

(56) References Cited

U.S. PATENT DOCUMENTS

2012/0295996 A1* 11/2012 Wang ...................... C09D 7/45
                                                      521/85

FOREIGN PATENT DOCUMENTS

| CN | 106479291 A | * | 3/2017 |
| JP | 2014-231597 A | | 12/2014 |

(Continued)

OTHER PUBLICATIONS

Korean Office Action for related KR Application No. 10-2022-0152276 mailed Mar. 21, 2023 from Korean Intellectual Property Office.

*Primary Examiner* — John D Freeman
(74) *Attorney, Agent, or Firm* — Paratus Law Group, PLLC

(57) ABSTRACT

There is provided an FRP material with reinforced non-flammability that can be utilized as an alternative to a metal material in a variety of applications. The FRP material with reinforced non-flammability includes a non-flammable coating layer formed by coating, with a non-flammable agent, a surface of a flame retardant FRP matrix containing a flame retardant resin, wherein a composition of the non-flammable coating layer includes 10 to 20 wt % of 1,3,5-triazine-2,4,6-triamine, 30 to 50 wt % of ammonium polyphosphate, 1 to 10 wt % of dimethyl polysiloxane, 10 to 20 wt % of xylene, and 10 to 30 wt % of phosphonic acid, p-methyl-, (5-ethyl-2-methyl-2-oxido-1,3,2-dioxaphosphorinan-5-yl)methyl methyl ester.

15 Claims, 1 Drawing Sheet

(51) Int. Cl.
  *C08J 7/04*      (2020.01)
  *C08J 7/05*      (2020.01)
  *C08K 3/32*      (2006.01)
  *C08K 5/5333*    (2006.01)
  *C08L 83/04*     (2006.01)
  *C09D 183/04*    (2006.01)

(52) U.S. Cl.
  CPC .......... *C08K 5/5333* (2013.01); *C08L 83/04* (2013.01); *C09D 183/04* (2013.01); *C08J 7/042* (2013.01); *C08J 2483/04* (2013.01); *C08K 2003/322* (2013.01)

(56) References Cited

FOREIGN PATENT DOCUMENTS

| | | |
|---|---|---|
| KR | 10-2011-0094006 A | 8/2011 |
| KR | 10-1618252 B1 | 5/2016 |
| KR | 10-2021-0079285 A | 6/2021 |
| KR | 10-2285113 B1 | 8/2021 |

\* cited by examiner

FRP BOARD WITH REINFORCED NON-FLAMMABILITY

CROSS-REFERENCE TO PRIOR APPLICATIONS

This application claims priority to Korean Patent Application Nos. 10-2021-0174194 (filed on Dec. 7, 2021), 10-2021-0174195 (filed on Dec. 7, 2021), 10-2022-0152276 (filed on Nov. 15, 2022), and 10-2022-0152277 (filed on Nov. 15, 2022), which are all hereby incorporated by reference in their entirety.

BACKGROUND

The present invention relates to an FRP material reinforced with non-flammability, corrosion resistance and waterproofness, and more particularly, to an FRP material with improved non-flammability, and reinforced corrosion resistance and waterproofness so as to withstand fire for a long time without burning.

In general, fiberglass reinforced plastic (hereinafter referred to as "FRP") is a composite material that uses a resin with excellent water resistance, chemical resistance, and heat resistance, and glass fibers with excellent tensile strength and thus exhibits excellent corrosion resistance, heat resistance, high durability and light weight, and is easy to blend with other materials due to excellent adhesiveness thereof.

Pipes produced from FRP having such characteristics are used as transport passages for transporting highly corrosive gas, wastewater, and sewage, or tanks produced therefrom are used as reaction tanks in chemical plants, chemical tanks for processes in semiconductor plants, raw material storage containers in food factories, and corrosion-resistant chemical storage containers.

In addition, the FRP is produced as a lining material and lines the inner surface of the wall, such as a concrete water tank, so that the airtightness and watertightness of the concrete water tank can be maintained.

In addition, the structure can be reinforced by adhering the FRP to the outside of the structure using epoxy or through a formed groove.

However, the method of reinforcing the structure using the FRP has problems in that the structure may be broken or damaged under the environments of epoxy slip, external impact, and high temperature (about 102° C., which is the glass transition temperature of the epoxy-based FRP resin), fixing ability thereof to the FRP may be readily lost and the structure is very vulnerable to fire.

The prior art relating to the reinforcement method using FRP includes Korean Patent No. 10-1618252 (registered on Apr. 28, 2016) that discloses a fiber-reinforced plastic (FRP) reinforcement device and a method of reinforcing a structure using the same.

The fiber-reinforced plastic (FRP) reinforcement device of the Korean patent includes an FRP core formed to have a bar shape by arranging a plurality of fiber bundles in the form of roving and impregnating the fiber bundles with a resin, an anchor mount that is disposed perpendicular to the FRP core and is formed by arranging a plurality of fiber bundles in the form of roving and impregnating the fiber bundles with a resin, and an anchor disposed to surround the outer surface of the anchor mount and to be inserted into and fixed in a hole (H) provided in a structure to be reinforced.

The fiber-reinforced plastic (FRP) reinforcement device of the patent having the configuration described above can further improve the reinforcement performance because a first spray-type fiber-reinforced coating layer is covered with an FRP core to prevent local destruction due to stress concentration of the spray-type fiber-reinforced coating layer and a second fiber-reinforced coating layer is laminated in a spray manner on the outer surface of the FRP core to more firmly fix the first fiber-reinforced coating layer and the FRP core to the surface of the structure, and prevent the end parts from peeling off.

However, the fiber-reinforced plastic (FRP) reinforcement device of the patent is disadvantageously vulnerable to fire.

That is, the FRP of the patent is structurally reinforced, but is disadvantageously vulnerable to fire.

In other words, conventional FRP materials are lightweight, robust and thus durable, but are vulnerable to fire due to low non-flammability thereof.

Accordingly, the conventional FRP material is difficult to use as a non-flammable material due to poor non-flammability thereof and the usability thereof is low due to inapplicability to coal-fired power plant equipment, electronic company equipment, chemical plant company equipment, and the like, which are exposed to a lot of corrosion and fire.

That is, in preparation for the occurrence of fire, the companies, which suffer from exposure to a lot of corrosion and fire, have no choice but to use metal materials that are resistant to fire, but are heavy, expensive, and vulnerable to corrosion.

PRIOR ART

Patent Document

Korean Patent No. 10-1618252

SUMMARY

Therefore, the present invention has been made in view of the above problems, and it is one object of the present invention to provide an FRP material with reinforced non-flammability that is utilized as an alternative to a metal material in a variety of applications based on reinforced non-flammability or the like.

It is another object of the present invention to provide an FRP material with reinforced corrosion resistance and waterproofness as well as non-flammability.

In accordance with the present invention, the above and other objects can be accomplished by the provision of an FRP material with reinforced non-flammability including a non-flammable coating layer formed by coating, with a non-flammable agent, a surface of a flame retardant FRP matrix containing a flame retardant resin, wherein a composition of the non-flammable coating layer includes 10 to 20 wt % of 1,3,5-triazine-2,4,6-triamine, 30 to 50 wt % of ammonium polyphosphate, 1 to 10 wt % of dimethyl polysiloxane, 10 to 20 wt % of xylene, and 10 to 30 wt % of phosphonic acid, p-methyl-, (5-ethyl-2-methyl-2-oxido-1,3,2-dioxaphosphorinan-5-yl)methyl methyl ester.

In this case, the composition of the non-flammable coating layer may further include polyoxyethylene sorbitan ester.

The flame retardant resin may include a Teflon, polyvinyl chloride (PVC), nylon or polycarbonate (PC) resin.

The composition of the non-flammable coating layer may further include 1 to 5 wt % of a phosphorus-based polymer formed by modifying polypropylene glycol through phosphorylation.

In this case, the phosphorylation may be performed by adding 30 to 60 parts by weight of tricresyl phosphate (TCP) and 2 to 8 parts by weight of xylene based on 100 parts by weight of the polypropylene glycol and performing reaction at 80 to 95° C.

The FRP material may further include a flame retardant coating layer coating a surface of the non-flammable coating layer, wherein the composition of the non-flammable coating layer includes 10 to 20 wt % of 1,3,5-triazine-2,4,6-triamine, 30 to 50 wt % of ammonium polyphosphate, 1 to 10 wt % of dimethyl polysiloxane, 10 to 20 wt % of xylene, and 10 to 30 wt % of phosphonic acid, p-methyl-, (5-ethyl-2-methyl-2-oxido-1,3,2-dioxaphosphorinan-5-yl)methyl methyl ester, and a composition of the flame retardant coating layer includes a vinyl ester resin containing a halogen element.

In this case, the vinyl ester resin may have an oxygen index (OI) of 32 to 38.

Also, the halogen element may include bromine (Br).

In accordance with another aspect of the present invention, there is provided an FRP material with reinforced non-flammability including a non-flammable coating layer formed by coating, with a non-flammable agent, a surface of a flame retardant FRP matrix containing a flame retardant resin, wherein a composition of the non-flammable coating layer includes 35 to 45 wt % of water, 2 to 5 wt % of titanium oxide, 0.1 to 1.0 wt % of melamine, 30 to 35 wt % of pentaerythritol, and 25 to 30 wt % of an ethylene/vinyl acetate (VA) copolymer.

In this case, the flame retardant resin may include a Teflon, polyvinyl chloride (PVC), nylon or polycarbonate (PC) resin.

The composition of the non-flammable coating layer may further include 1 to 5 wt % of a phosphorus-based polymer formed by modifying polypropylene glycol through phosphorylation.

The phosphorylation may be performed by adding 30 to 60 parts by weight of tricresyl phosphate (TCP) and 2 to 8 parts by weight of xylene based on 100 parts by weight of the polypropylene glycol and performing reaction at 80 to 95° C.

The FRP material may further include a flame retardant coating layer coating a surface of the non-flammable coating layer, wherein the composition of the non-flammable coating layer includes 10 to 20 wt % of 1,3,5-triazine-2,4,6-triamine, 30 to 50 wt % of ammonium polyphosphate, 1 to 10 wt % of dimethyl polysiloxane, 10 to 20 wt % of xylene, and 10 to 30 wt % of phosphonic acid, p-methyl-, (5-ethyl-2-methyl-2-oxido-1,3,2-dioxaphosphorinan-5-yl)methyl methyl ester, and the composition of the flame retardant coating layer includes a vinyl ester resin containing a halogen element.

The vinyl ester resin may have an oxygen index (CI) of 32 to 38.

Also, the halogen element may include bromine (Br).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, the FRP material with reinforced non-flammability according to an embodiment of the present invention will be described in detail with reference to the accompanying drawings. Terms used in this specification are terms used to appropriately express preferred embodiments of the present invention, which may vary according to the intention of a user or operator or conventions in the field to which the present invention pertains. Therefore, definitions of these terms will have to be made based on the content throughout this specification.

Hereinafter, preferred embodiments according to the present invention will be described in detail with reference to the accompanying drawings.

Figure 1:
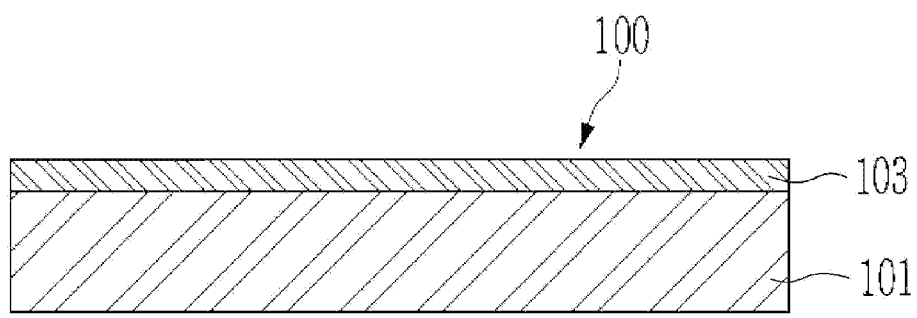
FIG. 1 is a cross-sectional view illustrating an FRP material with reinforced non-flammability according to the present invention.

FIG. 1 is a cross-sectional view illustrating an FRP material with reinforced non-flammability according to the present invention.

Referring to FIG. 1, the FRP material 100 with reinforced non-flammability according to the present invention includes a flame retardant FRP matrix 101 containing a flame retardant resin, and a non-flammable coating layer 103 formed by coating the surface of the flame retardant FRP matrix 101 with a non-flammable agent.

The flame retardant resin contained in the flame retardant FRP matrix 101 includes a Teflon, polyvinyl chloride (PVC), nylon or polycarbonate (PC) resin.

However, the flame retardant resin is not limited to the resins listed above.

For example, as an oxygen index (OI) increases, the potential for combustion decreases. Therefore, any resin may be used as the flame retardant resin without particular limitation as long as it has a high oxygen index (20 or more).

In an embodiment, the composition of the non-flammable coating layer 103 includes 10 to 20 wt % of 1,3,5-triazine-2,4,6-triamine, 30 to 50 wt % of ammonium polyphosphate, 1 to 10 wt % of dimethyl polysiloxane, 10 to 20 wt % of xylene, 10 to 30 wt % of phosphonic acid, p-methyl-, (5-ethyl-2-methyl-2-oxido-1,3,2-dioxaphosphorinan-5-yl) methyl methyl ester, and 1 to 5 wt % of a phosphorus-based polymer formed by modifying polypropylene glycol through phosphorylation.

In the composition of the non-flammable coating layer 103 according to the embodiment, the 1,3,5-triazine-2,4,6-triamine is a halogen-free non-flammable agent and functions to prevent ignition in the composition.

The ammonium polyphosphate is a phosphorus-nitrogen non-flammable agent and acts as a non-flammable agent based on surface coating in the combustion process, heat dissipation by evaporation of phosphorus compounds, dilution of decomposition products, reduction of melt viscosity, and the like.

Therefore, the ammonium polyphosphate is present in the highest amount (30 to 50 wt %) in the composition.

In addition, since the dimethyl polysiloxane is an inert substance and thus is chemically very stable, it maintains the original state thereof while remaining unchanged although reacted with other compositions, and thus is non-flammable and is particularly nontoxic.

In addition, the xylene is contained in the composition to act as an adhesive agent to perform coating.

In addition, the phosphonic acid, p-methyl-, (5-ethyl methyl-2-oxido-1,3,2-dioxaphosphorinan-5-yl)methyl methyl ester is present in the composition to function to reduce smoke density.

Meanwhile, the composition of the non-flammable coating layer 103 may further include polyoxyethylene sorbitan ester. Since the polyoxyethylene sorbitan ester has excellent emulsifying ability and dispersibility, the dispersibility of the oil-based non-flammable coating liquid constituting the non-flammable coating layer can be improved.

The phosphorus polymer is formed by modifying polypropylene glycol through phosphorylation. The phosphorylation is performed by adding 30 to 60 parts by weight of tricresyl phosphate (TCP) and 2 to 8 parts by weight of xylene based on 100 parts by weight of the polypropylene glycol and performing reaction at 80 to 95° C. for a certain period of time, for example, 8 hours. After the phosphorylation, the resulting product may be concentrated under reduced pressure and washed to prepare a phosphorus-based polymer.

The phosphorus-based polymer is capable of improving the dispersibility and bonding ability between the non-flammable ingredients and the resin. When the phosphorus polymer is contained, the viscosity of the resin composition is lowered and workability can be improved. This is because the non-flammable ingredient of the phosphorus-based polymer improves dispersibility with the resin constituting the FRP.

The phosphorus-based polymer is preferably present in an amount of 1 to 5% by weight in the composition of the non-flammable coating layer 103. When the phosphorus-based polymer is used in an amount of 1 wt % or less, it is difficult to disperse with other ingredients due to high viscosity of the coating. When the amount of the phosphorus-based polymer exceeds 5 wt %, other non-flammable ingredients are rapidly precipitated, resulting in a deterioration in the non-flammability or adhesiveness.

As described above, the composition contained in the non-flammable coating layer 103 according to one embodiment is a substance that contributes to non-flammability and coatability, and is coated on the flame-retardant FRP matrix 101 containing a flame-retardant resin, to manufacture FRP materials with improved non-flammability, the property of enduring fire well without burning.

In addition, in another embodiment, the composition of the non-flammable coating layer 103 includes 35 to 45 wt % of water, 2 to 5 wt % of titanium oxide, 0.1 to 1.0 wt % of melamine, 30 to 35 wt % of pentaerythritol or pentaerythritol tetranitrate (PETN), 25 to 30 wt % of an ethylene/vinyl acetate (VA) copolymer, and 1 to 5 wt % of a phosphorus-based polymer formed by modification of polypropylene glycol through phosphorylation.

The titanium oxide is present in a powder form in the composition of the non-flammable coating layer 103 according to another embodiment and is present in a small amount (2 to 5 wt %) due to the very high boiling point (about 2,900° C.) and flash point (about 2,500 to 3,000° C.) thereof.

In addition, the melamine is present in a trace amount (0.1 to 1.0 wt %) to impart an adhesive function.

In addition, the pentaerythritol has a flame resistance and flame retardant function in the composition. Accordingly, the pentaerythritol is present in a great amount (30 to 35 wt %), second only to water, in the composition.

In addition, the ethylene/VA copolymer serves as an adhesive, binder, and film-forming agent in the composition.

The phosphorus-based polymer is formed by modifying polypropylene glycol through phosphorylation. The phosphorylation is performed by adding 30 to 60 parts by weight of tricresyl phosphate (TCP) and 2 to 8 parts by weight of xylene based on 100 parts by weight of the polypropylene glycol and reacting these ingredients at 80 to 95° C. for a predetermined period of time, for example, 8 hours. After phosphorylation, the resulting product may be concentrated under reduced pressure and washed to prepare the phosphorus-based polymer.

The composition ratio and function of the phosphorus-based polymer are the same as those described in the composition of the non-flammable coating layer 103 of the embodiment and thus a detailed description thereof will be omitted.

Such a composition is mixed with water (35 to 45 wt %) to form a non-flammable coating layer 103.

The flame retardant FRP matrix 101 is coated with the non-flammable coating layer 103 and then dried in the air or in an oven to produce an FRP material 100 with reinforced non-flammability.

Meanwhile, the coating thickness of the non-flammable coating layer 103 is not limited to a specific value as long as it can withstand fire.

The coating thickness may vary depending on the thickness or area of the flame retardant FRP matrix 101, may also vary depending on lining or wall reinforcement application, and should be determined in consideration of economic feasibility as well.

The action of the FRP material with reinforced non-flammability according to the present invention having the configuration as described above is as follows.

Referring to FIG. 1 again, the FRP material 100 with reinforced non-flammability according to the present invention includes a flame retardant FRP matrix 101 containing a flame retardant resin and a non-flammable coating layer 103 formed on the surface of the flame retardant FRP matrix 101.

Therefore, the FRP material 100 with reinforced non-flammability according to the present invention is reinforced with non-flammability even at high temperature by imparting non-flammability to the flame-retardant FRP matrix 101 with corrosion resistance, waterproofness, lightness and robustness, and may be utilized in a variety of applications.

Meanwhile, conventional FRP materials are resistant to corrosion, lightweight, and robust, but are vulnerable to fire and thus have very limited applications.

However, the FRP material 100 with reinforced non-flammability according to the present invention is imparted with non-flammability and thus can replace conventional metal materials that have inevitably been used to prepare for fire although they are heavy, expensive, and weak against corrosion.

Meanwhile, the FRP material 100 with reinforced non-flammability according to the present invention may include a flame retardant coating layer 105 formed by coating the surface of the non-flammable coating layer 103 with a flame retardant agent.

The composition of the flame retardant coating layer 105 includes a vinyl ester resin containing a great amount of halogen.

A vinyl ester resin containing a great amount of halogen exhibits excellent flame retardancy and particularly excellent corrosion resistance.

In addition, the vinyl ester resin of the composition of the flame retardant coating layer 105 has excellent heat resistance, light weight and high specific strength, and has a high oxygen index (OI) of 32 to 38.

In addition, the halogen of the flame retardant coating layer 105 includes Br (bromine).

The Br acts as a flame retardant in the composition of the flame retardant coating layer 105.

As such, the flame retardant FRP matrix 101 is coated with both the non-flammable coating layer 103 and the flame retardant coating layer 105 and then dried in the air or in an oven to complete an FRP material 100 with reinforced non-flammability, corrosion resistance and waterproofness according to the present invention.

Meanwhile, the coating thicknesses of the non-flammable coating layer 103 and the flame retardant coating layer 105 are not limited to specific values as long as they can exhibit non-flammability, corrosion resistance and waterproofness.

The coating thickness may vary depending on the thickness or area of the flame retardant FRP matrix 101, may also vary depending on lining or wall reinforcement application, and should be determined in consideration of economic feasibility as well.

The action of the FRP material with reinforced non-flammability, corrosion resistance and waterproofness according to the present invention having the configuration as described above is as follows.

Figure 2:
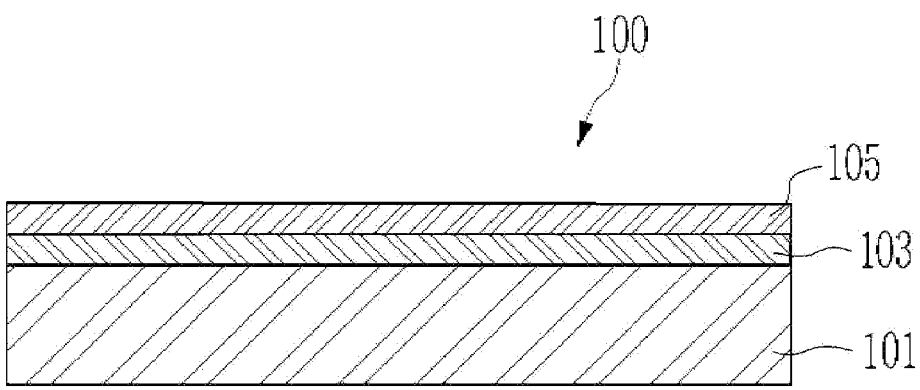
FIG. 2 is a cross-sectional view illustrating the FRP material with reinforced non-flammability of FIG. 1, having a structure in which a flame retardant coating layer is formed on a non-flammable coating layer.

Referring to FIG. 2 again, the FRP material 100 with reinforced non-flammability, corrosion resistance and waterproofness according to the present invention includes a non-flammable coating layer 103 and a flame retardant coating layer 105 sequentially formed on the surface of a flame retardant FRP matrix 101 containing a flame retardant resin.

That is, when only the non-flammable coating layer 103 is formed, moisture may be absorbed and the resulting structure is inapplicable as an exterior material.

In order to solve this problem, it is possible to manufacture an FRP material that is resistant to fire and has strong moisture resistance by forming the non-flammable coating layer 105 containing a flame retardant resin composition having excellent moisture resistance on the surface of the flame retardant coating layer 103.

Therefore, the FRP material 100 that is imparted with non-flammability, corrosion resistance, and waterproofness by the flame retardant coating layer 105 can be utilized in a variety of applications by imparting non-flammability, corrosion resistance, and waterproofness to the flame retardant FRP matrix 101 with corrosion resistance, waterproofness, lightness, and robustness.

On the other hand, conventional FRP materials are lightweight and robust, but are vulnerable to fire and have very limited applications. However, the FRP material 100 with reinforced non-flammability, corrosion resistance and waterproofness according to the present invention is imparted with flame retardancy as well as non-flammability, corrosion resistance, waterproofness, and thus can replace conventional metal materials that have inevitably been used to prepare for fire although they are heavy, expensive, and weak against corrosion.

That is, the FRP material 100 with reinforced non-flammability, corrosion resistance and waterproofness according to the present invention can replace conventional FRP products or metal products installed in coal-fired power plant equipment, electronic company equipment, chemical plant company equipment, etc. that are exposed to severe corrosion and fire.

As is apparent from the above description, according to an embodiment of the present invention, it is possible to manufacture an FRP material with reinforced non-flammability by forming the non-flammable coating layer on the surface of the flame retardant FRP matrix containing the flame retardant resin.

In addition, it is possible to manufacture an FRP material with reinforced non-flammability, corrosion resistance and waterproofness by forming the flame retardant coating layer on the non-flammable coating layer.

In addition, it is possible to improve the dispersibility and bonding ability between the FRP resin and the non-flammable coating layer and thus further reinforce non-flammability and improve durability by adding a novel phosphorus-based polymer to the non-flammable coating layer composition.

In particular, it is possible to improve corrosion resistance as well as flame retardancy by applying a vinyl ester resin containing a halogen group element to the flame retardant coating layer.

Therefore, the FRP material according to the present invention can be utilized in a variety of applications or purposes as an alternative to conventional metal materials or FRP products that have inevitably been used to prepare for fire although they are heavy, expensive, and weak against corrosion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to coal-fired power plant equipment, electronic company equipment, chemical plant company equipment, and the like that are exposed to severe corrosion and fire.

What is claimed is:

1. A fiberglass reinforced plastic (FRP) material with reinforced non-flammability, comprising:
    a flame retardant FRP matrix containing a flame retardant resin; and
    a non-flammable coating layer disposed on a surface of the flame retardant FRP matrix and formed from a non-flammable composition,
    wherein the non-flammable composition comprises:
        10 to 20 wt % of 1,3,5-triazine-2,4,6-triamine;
        30 to 50 wt % of ammonium polyphosphate;
        1 to 10 wt % of dimethyl polysiloxane;
        10 to 20 wt % of xylene; and
        10 to 30 wt % of phosphonic acid, p-methyl-, (5-ethyl-2-methyl-2-oxido-1,3,2-dioxaphosphorinan-5-yl) methyl methyl ester.

2. The FRP material according to claim 1, wherein the non-flammable composition of the non-flammable coating layer further comprises polyoxyethylene sorbitan ester.

3. The FRP material according to claim 1, wherein the flame retardant resin comprises a resin selected from the group consisting of polytetrafluoroethylene (PTFE), polyvinyl chloride (PVC), nylon, and polycarbonate (PC).

4. The FRP material according to claim 1, wherein the non-flammable composition further comprises 1 to 5 wt % of a phosphorus-based polymer formed by modifying polypropylene glycol through phosphorylation.

5. The FRP material according to claim 4, wherein the phosphorylation is performed by adding 30 to 60 parts by weight of tricresyl phosphate (TCP) and 2 to 8 parts by weight of xylene based on 100 parts by weight of the polypropylene glycol and performing reaction at 80 to 95° C.

6. The FRP material according to claim 1, further comprising a flame retardant coating layer coating a surface of the non-flammable coating layer,
wherein the flame retardant coating layer comprises a vinyl ester resin containing a halogen element.

7. The FRP material according to claim 6, wherein the vinyl ester resin has an oxygen index (OI) of 32 to 38.

8. The FRP material according to claim 6, wherein the halogen element comprises bromine (Br).

9. A fiberglass reinforced plastic (FRP) material with reinforced non-flammability, comprising:
a flame retardant FRP matrix containing a flame retardant resin; and
a non-flammable coating layer disposed on a surface of the flame retardant FRP matrix and formed from a non-flammable composition,
wherein the non-flammable composition comprises:
35 to 45 wt % of water;
2 to 5 wt % of titanium oxide;
0.1 to 1.0 wt % of melamine;
30 to 35 wt % of pentaerythritol; and
25 to 30 wt % of an ethylene/vinyl acetate (VA) copolymer.

10. The FRP material according to claim 9, wherein the flame retardant resin comprises a resin selected from the group consisting of polytetrafluoroethylene (PTFE), polyvinyl chloride (PVC), nylon, and polycarbonate (PC) resin.

11. The FRP material according to claim 9, wherein the non-flammable composition further comprises 1 to 5 wt % of a phosphorus-based polymer formed by modifying polypropylene glycol through phosphorylation.

12. The FRP material according to claim 11, wherein the phosphorylation is performed by adding 30 to 60 parts by weight of tricresyl phosphate (TCP) and 2 to 8 parts by weight of xylene based on 100 parts by weight of the polypropylene glycol and performing reaction at 80 to 95° C.

13. The FRP material according to claim 9, further comprising a flame retardant coating layer coating a surface of the non-flammable coating layer,
wherein the flame retardant coating layer comprises a vinyl ester resin containing a halogen element.

14. The FRP material according to claim 13, wherein the vinyl ester resin has an oxygen index (OI) of 32 to 38.

15. The FRP material according to claim 13, wherein the halogen element comprises bromine (Br).

* * * * *